UNITED STATES PATENT OFFICE.

ALBERT HESSE, OF BERLIN, GERMANY.

MAGNESIUM COMPOUND OF PINENE HALOIDS AND PROCESS OF MAKING SAME.

No. 826,166.

Specification of Letters Patent.

Patented July 17, 1906.

Application filed November 4, 1905. Serial No. 285,871.

*To all whom it may concern:*

Be it known that I, ALBERT HESSE, doctor of philosophy, chemist, a subject of the German Emperor, residing at Berlin, Kingdom of Prussia, German Empire, have invented a new and useful Improvement in the Manufacture of Organic Magnesium Compounds, of which the following is a specification.

The hydrohaloids of pinene (pinene hydrochlorid, pinene hydrobromid, pinene hydro-iodid) form with magnesium organic magnesium compounds having the general formula $C_{10}H_{17}MgX$, in which formula "X" is meant for a halogen atom, (Cl or Br or I.) The magnesium compound of pinene hydrochlorid is already mentioned in the *Berichte der Deutschen Chemischen Gesellschaft*, Vol. 35, p. 3,695; but a method for obtaining it is not described, and it may therefore be taken as granted that the compound was produced in the then usual method first described by Grignard—viz., treating a solution of pinene hydrochlorid in absolute ether with magnesium.

Repeated experiments for carrying out such a process have shown that only a small proportion of pinene hydrochlorid is transformed into the magnesium compound. Heating the solution also gives no better yield. According to my invention, however, a great yield may be obtained. The new process consists in causing a solution of a pinene hydrohaloid—for instance, pinene hydrochlorid— to react upon magnesium in the presence of a catalytic reagent—as, for instance, iodin or an organic halogen compound well reacting with magnesium, such as methyliodid, ethyliodid, ethylbromid, benzene bromid, benzene iodid, benzylchlorid, bornyliodid, and the like. The best results are obtained if one proceeds in such a way that the reaction is introduced by first reacting with an ethereal solution of an alkyl or aryl halogen compound as above named upon magnesium, and that thereupon a solution of a pinene hydrohaloid is added to this mixture. In this latter way a yield of about eighty to eighty-five per cent. of the magnesium compound is obtained. Such a yield is quite unexpected in view of the known instability of such terpene compounds.

The pinene hydrochlorid is dissolved either in ether or in benzene, toluol, xylol, and other suitable hydrocarbons or in a mixture of ether and hydrocarbons. If the ether be wholly or partly replaced by the said solvents, the amount of the ether necessary for the reaction can be considerably reduced, and the boiling-point of the whole mixture can be raised in such a manner that only a small quantity of the ether volatilizes. The hydrocarbons may be wholly or partly replaced by other suitable organic solvents, such as anilin, toluidin, dimethylanilin, diethylanilin, amyl ether, anisol, and the like. The ether used for the solution of the catalytic reagent may be partly replaced by other suitable solvents.

Examples.

1. 0.2 kilogram of ethylbromid dissolved in 0.8 kilogram of dry ether is poured over 1.4 kilograms of metallic magnesium. After stirring for a short time an energetic reaction commences which manifests itself by the brisk boiling of the ether. Before the reaction is complete a solution of ten kilograms of pinene hydrochlorid in six kilograms of dry ether is gradually allowed to flow into the mixture, which is kept in continuous movement. The addition of the solution can be so regulated that a quiet boiling ensues. After the whole solution of the pinene hydrochlorid has been added the mixture is stirred until it cools of itself.

2. To 1.6 kilograms of metallic magnesium a solution of 0.3 kilogram of benzene iodid in 0.7 kilogram of dry ether is gradually added. When the reaction, which commences at once, is proceeding briskly, a solution of 2.5 kilograms of pinene hydrochlorid in 1.8 kilograms of ether is added, the mixture being kept constantly stirred, and, further, a solution of 7.5 kilograms of pinene hydrochlorid in five kilograms of benzene (or toluol, xylol, pinene, or other suitable hydrocarbon) is added thereto. By regulating the supply of the solution or by cooling the vessel in which the reaction takes place the temperature is kept within moderate limits, so that it does not exceed 50° to 60° centigrade. When the whole solution is added and the product of the reaction is cool, stirring is continued for one or two hours, during which operation, as during the whole process, moisture, oxygen, carbonic acid, &c., must be prevented from reaching the product of the reaction.

3. To 0.9 kilogram of magnesium is added a solution of 0.15 kilogram of ethyliodid in one kilogram of ether while continuously stirring and then still stirring a solution of six kilograms of pinene hydrochlorid in six kilograms of toluol. The brisk reaction is moderated by cooling the vessel in which the reaction takes place in such a manner that the temperature of the mass does not rise above 60° centigrade. The process is continued as in Example 2.

4. To a mixture of 1.5 kilograms of magnesium with a solution of ten kilograms of pinene hydrochlorid in four kilograms of ether and six kilograms of benzene 0.2 kilogram of iodin is added and the mixture heated for about five hours at boiling-point or in an autoclave to 100° centigrade.

5. To 1.5 kilograms of magnesium a solution of two kilograms of pinene hydrochlorid in two kilograms of ether and a solution of 0.2 kilogram of ethylbromid in one kilogram of ether are added, and the mixture is heated with a reflux condenser. A solution of eight kilograms of pinene hydrochlorid in six kilograms of benzene is then added, and the whole mass is boiled with a reflux condenser or heated to 100° centigrade in an autoclave.

The magnesium compounds of the other hydrohaloids of pinene are produced in an analogous manner.

I claim as my invention—

1. The process for the manufacture of magnesium compounds of pinene hydrohaloids having the above-given formula, which process consists in causing a solution of a pinene hydrohaloid to react upon magnesium in the presence of a catalytic reagent, and isolating the formed magnesium compound, substantially as set forth.

2. The process for the manufacture of magnesium compounds of pinene hydrohaloids having the above-given formula, which process consists in first allowing an ethereal solution of a suitable organic halogen compound to react upon magnesium, then adding a solution of the pinene hydrohaloid to the mixture and isolating the formed magnesium compound, substantially as set forth.

3. The process for the manufacture of a magnesium compound of pinene hydrochlorid, which consists in first allowing an ethereal solution of a suitable organic halogen compound to react upon magnesium, then adding a solution of the pinene hydrochlorid to the mixture, and isolating the formed magnesium compound, substantially as set forth.

In testimony whereof I have signed my name to this specification in the presence of two subscribing witnesses.

ALBERT HESSE.

Witnesses:
HENRY HASPER,
WOLDEMAR HAUPT.